United States Patent
Shimizu et al.

[11] Patent Number: 6,012,730
[45] Date of Patent: Jan. 11, 2000

[54] CABLE-TYPE STEERING DEVICE

[75] Inventors: Yasuo Shimizu; Hiroshi Tabata, both of Wako, Japan

[73] Assignee: Honda Giken Kogyo Kabushiki Kaisha, Tokyo, Japan

[21] Appl. No.: 08/917,338

[22] Filed: Aug. 25, 1997

[30] Foreign Application Priority Data

Aug. 26, 1996 [JP] Japan ................................. 8-223470

[51] Int. Cl.[7] .................................................. B60G 1/00
[52] U.S. Cl. ...................... 280/80.1; 180/417; 180/443; 74/505
[58] Field of Search ..................... 180/417, 443, 180/400; 74/502.4, 505, 506; 280/80.1, 93.502

[56] References Cited

U.S. PATENT DOCUMENTS

| | | | |
|---|---|---|---|
| 3,747,556 | 7/1973 | Kjellberg | 70/252 |
| 3,871,199 | 3/1975 | Perldal | 70/252 |
| 4,662,236 | 5/1987 | Kobayashi | 74/505 |
| 5,381,706 | 1/1995 | Yanusko et al. | 74/505 |
| 5,511,443 | 4/1996 | Munekhoff | 74/505 |
| 5,598,897 | 2/1997 | Sugiura | 180/417 |

FOREIGN PATENT DOCUMENTS 8-2431   1/1996   Japan .

*Primary Examiner*—Kevin Hurley
*Assistant Examiner*—Lynda Jasmin
*Attorney, Agent, or Firm*—Armstrong, Westerman, Hattori, McLeland, & Naughton

[57] ABSTRACT

A cable-type steering device is provided in which a sterring wheel and a gear box are connected to each other by wires, wherein a pulley to which wires are connected can be easily assembled to housings, while maintaining the enire length of the wire at a necessary minimum. A housing is divided into a first housing half and a second housing half. In assembling a pully having inner cables of Bowden wires previously wound therearound into the housing, collars mounted at ends of outer tubes of the Bowden wires are fixed in such a manner that they are sandwiched between a wire supporting groove in the first housing half and a lid portion of the second housing half.

9 Claims, 4 Drawing Sheets

CABLE-TYPE STEERING DEVICE

BACKGROUND OF THE INVENTION

1. Field of the Invention

The present invention relates to a cable-type steering device in which a steering wheel and a gear box are connected to each other by flexible cables such as Bowden wires.

2. Description of the Related Art

In a conventional steering device for a vehicle, a steering shaft having a steering wheel at an upper end thereof is connected at its lower end to the gear box, so that a steering torque inputted to the steering wheel is transmitted through the steering shaft to a rack and pinion mechanism which is mounted within the gear box.

However, if the steering wheel and the gear box are connected to each other using the steering shaft, it is difficult to freely select the position of the steering wheel relative to the position of the gear box. For this reason, there is encountered a problem that the degree of freedom of the design is substantially limited, but also the gear box cannot be commonly used in a right-hand steered vehicle and a left-hand steered vehicle. Moreover, another problem is that the vibration inputted to a tire from a road surface and the vibration of an engine are inputted to the steering wheel through the steering shaft and hence, the silence within a vehicle compartment and the riding comfort are impeded by such vibrations.

Therefore, there is a proposed cable-type steering device which employs a flexible transmitting means such as Bowden wire and the like in place of the conventional steering shaft (see Japanese Patent Application Laid-open No. 8-2431).

If the construction of the proposed cable-type steering device is used, the position of the steering wheel relative to the position of the gear box can be freely selected and moreover, the vibration of the gear box is difficult to be transmitted to the steering wheel and hence, the above-described problems can be solved.

In the conventional cable-type steering device, in assembling the pulley to which the wires are connected in the housing, an end of the wire is passed through a wire penetration bore defined in a housing body and is wound around the pulley. Then, the pulley is mounted into the housing body and covered by a housing cover. Therefore, in winding the end of the wire around the pulley, it is necessary to manually draw the wire by a sufficient length into the housing body through the penetration bore. For this reason, when the remainder of the wire is pulled out of the housing body after completion of the assembling, the wire remainder is largely loosened. Namely, there is a problem that unless the entire length of the wire is larger than a required length, assembly of the pulley and the wire to the housing fails.

SUMMARY OF THE INVENTION

The present invention has been accomplished in view of the above circumstances, and it is an object of the present invention to ensure that the wire driving means or the wire follower means to which the wire is connected can be easily assembled into the housing, while maintaining the entire length of the wire at a necessary minimum length.

To achieve the above object, the end of the wire is previously connected to the wire driving means and/or the wire follower means, and when the housing halves are to be coupled to each other with the wire driving means and/or the wire follower means being accommodated within the housing halves, the wire need only be sandwiched between division faces of the housing halves, thereby completing the assembly. Thus, the end of the wire need not be manually drawn into the housing in the assembly, and even if the length of the wire is of a necessary minimum value, the assembly can be achieved.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the preferred embodiment of the present invention which is illustrated in the accompanying drawings FIGS. 1 to 4.

Figure 1:
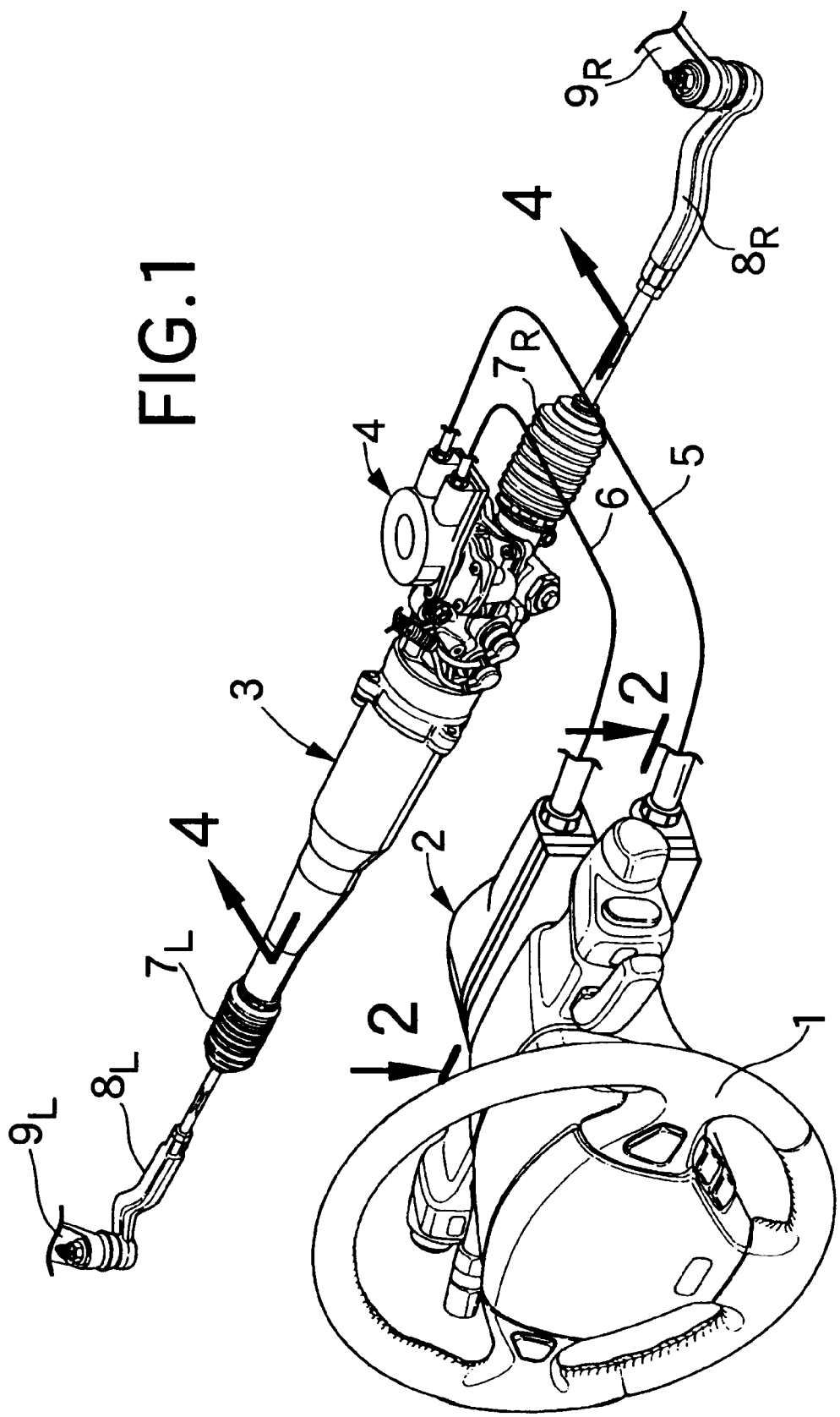
FIG. 1 is a perspective view of the entire arrangement of a steering device for a vehicle according to an embodiment.

As shown in FIG. 1, a driving pulley housing 2 mounted in front of a steering wheel 1 of a vehicle and a follower pulley housing 4 mounted on a gear box 3 are connected to each other by two Bowden wires 5 and 6. Tie rods $8_L$ and $8_R$ extend laterally of a vehicle body through boots $7_L$ and $7_R$ mounted at opposite ends of the gear box 3, and are connected to knuckles $9_L$ and $9_R$ for supporting left and right wheels (not shown).

Figure 2:
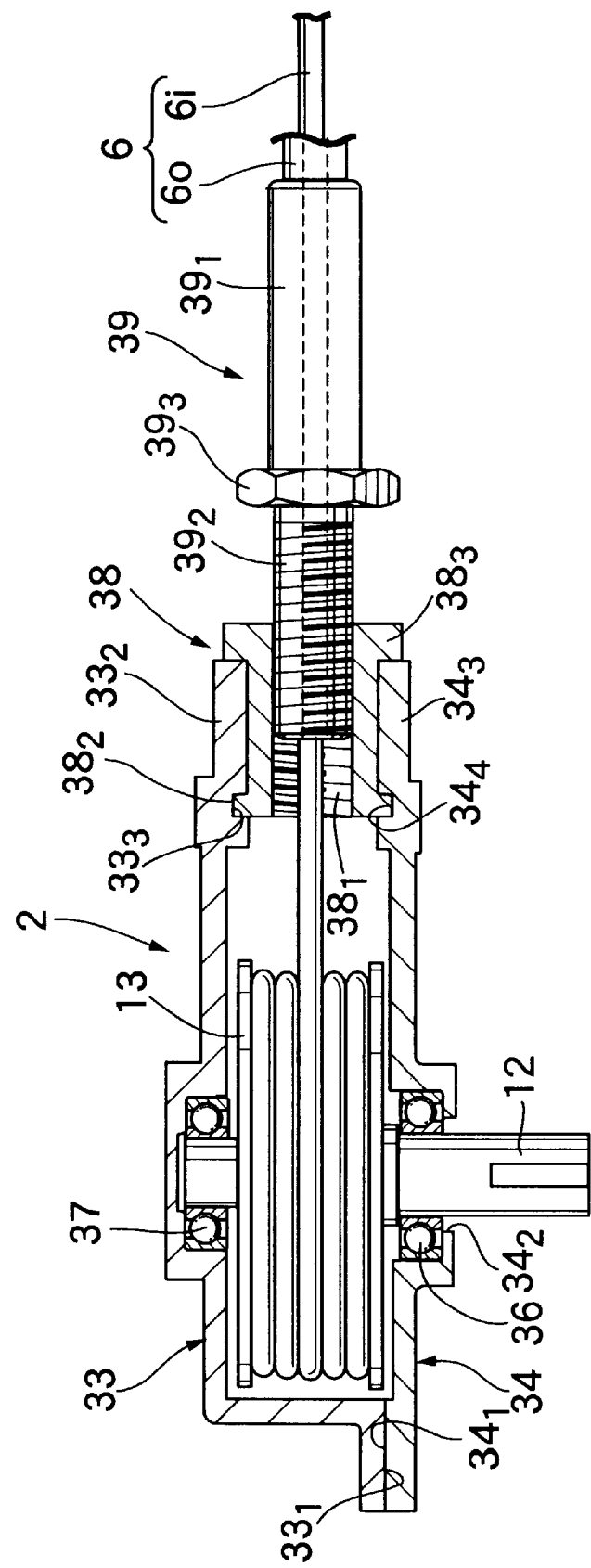
FIG. 2 is an enlarged sectional view taken along a line 2—2 in FIG. 1.
Figure 3:
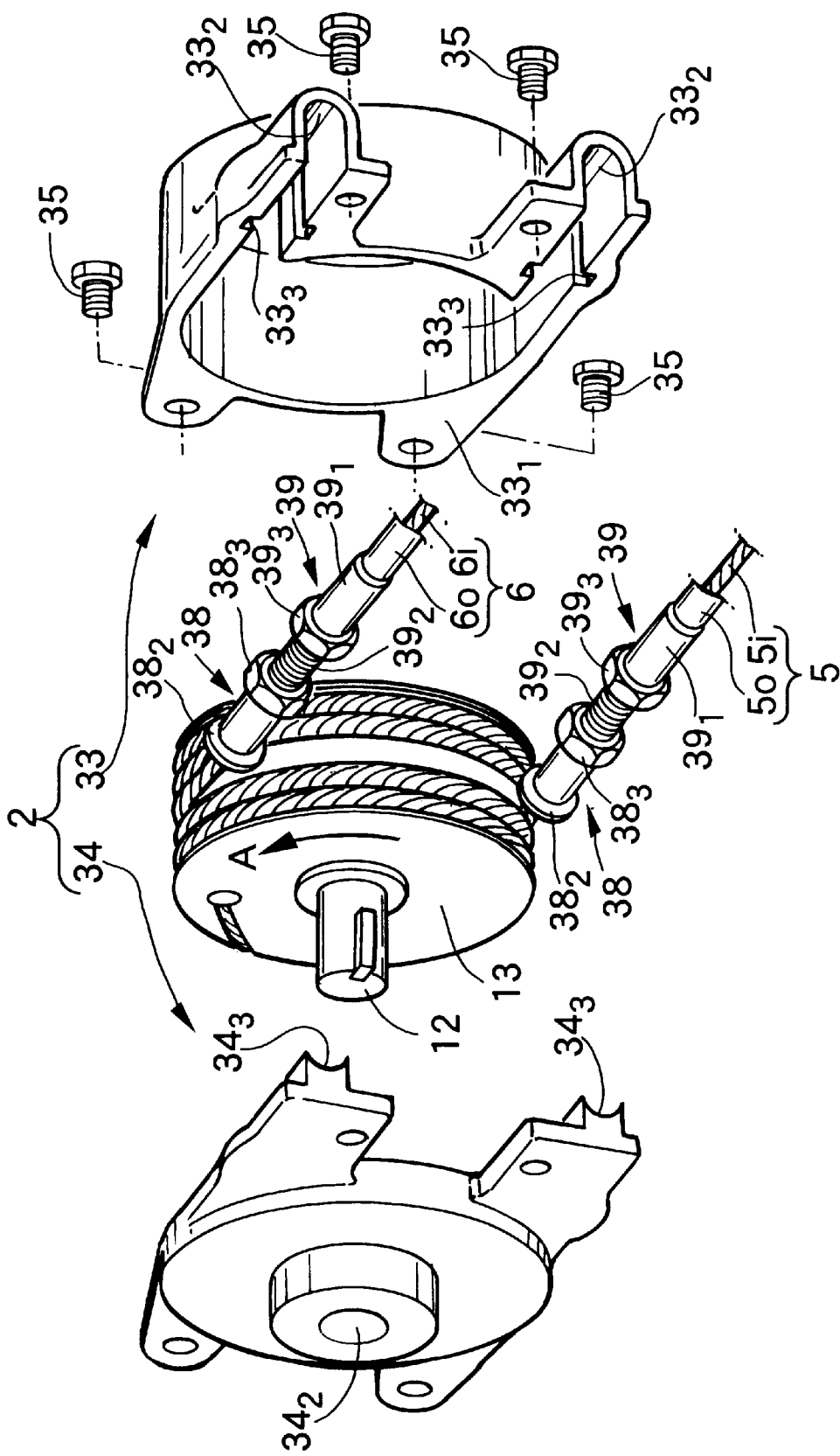
FIG. 3 is an exploded perspective view of a driving pulley and a driving pulley housing.

As shown in FIGS. 2 and 3, the driving pulley housing 2 is comprised of a vessel-like first housing half 33 with one side opened, and a second housing half 34 coupled to the first housing half 33 by four bolts 35 to close an opening in the first housing half 33. The housing halves 33 and 34 are coupled to each other at flat division faces $33_1$ and $34_1$ formed therein. A rotary shaft 12 rotated along with the steering wheel 1 is passed through a shaft bore $34_2$ provided in the second housing half 34 and is supported at its intermediate portion on ball bearings 36 and at its tip end on a ball bearing 37 provided in the first housing half 33. A driving pulley 13 is fixed to the rotary shaft 12 and accommodated in both the housing halves 33 and 34.

Each of the two Bowden wires 5 and 6 is comprised of an outer tube 5o, 6o, and an inner cable 5i, 6i slidably accommodated in the outer tube 50, 60, respectively. One end of the inner cables 5i and 6i are wound in a plurality of turns in a helical pulley groove defined around an outer periphery of the driving pulley 13, and one end of the outer tubes 5o and 6o are supported in the driving pulley housing 2 in a manner described below.

The first housing half 33 has a pair of wire supporting grooves $33_2$, $33_2$ defined therein to extend in a tangent direction of the driving pulley 13. The wire supporting grooves $33_2$, $33_2$ are formed into a U-shape in section and opens into the division face $33_1$. On the other hand, the second housing 34 has a pair of lid portions, $34_3$, $34_3$ integrally formed thereon, so that when the housing halves 33 and 34 are coupled to each other, the lid portions $34_3$, $34_3$ of the second housing half 34 close the openings in the wire supporting grooves $33_2$, $33_2$ in the first housing half 33.

Annular grooves $33_3$ and $34_4$ are defined in inner peripheral surfaces of bores circular in section and defined by the wire supporting groove $33_2$ and the lid portion $34_3$. A substantially cylindrical collar 38 has an internal threaded portion $38_1$ formed in an inner peripheral surface of a bore made through a central portion thereof, a circular flange portion $38_2$ formed at one axial end, and a hexagonal portion $38_3$ formed at the other axial end and capable of being engaged by a wrench. When the collar 38 is rotatably accommodated into a bore defined between the wire supporting groove $33_2$ and the lid portion $34_3$, the flange portion $38_2$ is engaged into the annular grooves $33_3$ and $34_4$ to position the collar 38 in an axially non-movable manner, and the hexagonal portion $38_3$ is exposed to the outside from the wire supporting groove $33_2$ and the lid portion $34_3$.

An end pipe 39 for fixing the ends of the outer tube 5o and 6o to the driving pulley housing 2 is comprised of a connecting portion $39_1$ fitted over outer peripheries of the outer tubes 5o and 6o and fixed by a caulking or the like, an external threaded portion $39_2$ threadedly inserted into the internal threaded portion $38_1$ of the collar 38, and a hexagonal portion $39_3$ provided between the connecting portion $39_1$ and the external threaded portion $39_2$.

Figure 4:
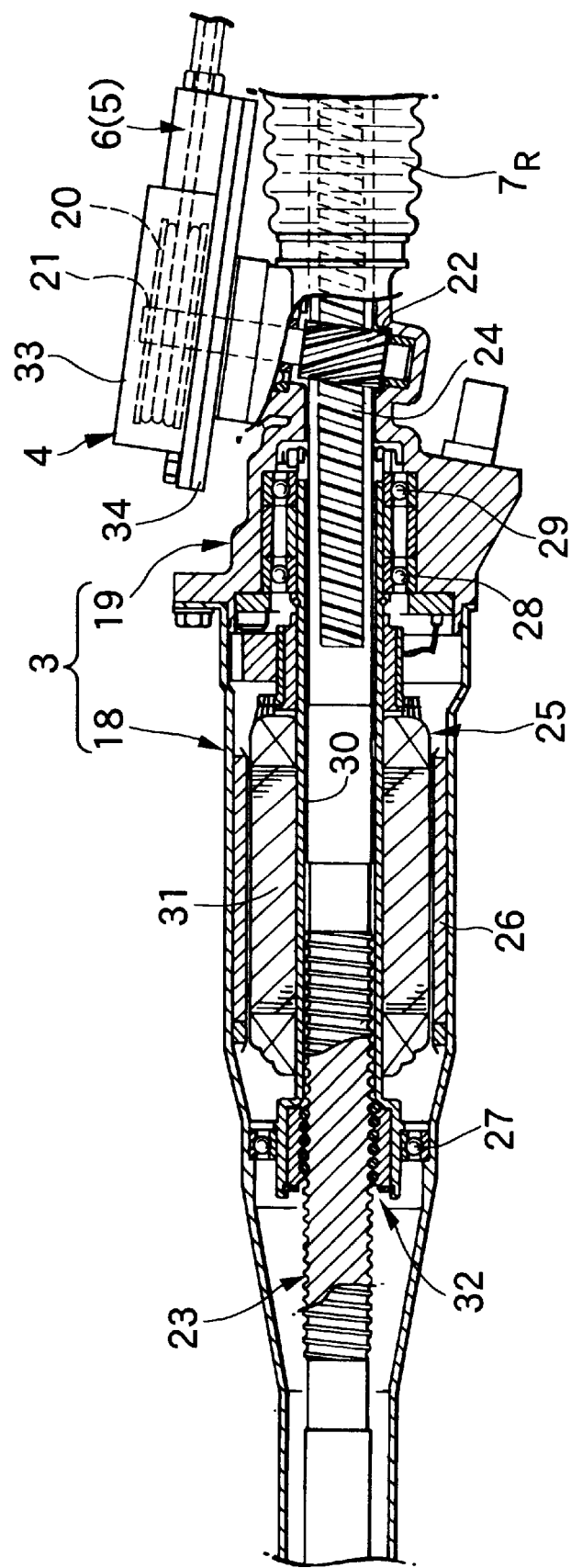
FIG. 4 is an enlarged sectional view taken along a line 4—4 in FIG. 1.

AS shown in FIG. 4, the gear box 3 is divided into a left motor accommodating chamber 18 and a right rack and pinion accommodating chamber 19. The follower pulley housing 4 is supported on the rack and pinion accommodating chamber 19. A rotary shaft 21 integral with a follower pulley 20 mounted in the follower pulley housing 4 extends into the rack and pinion accommodating chamber 19, and a pinion 22 is secured to such extension. A steering rod 23 connected at its opposite ends to the tie rods $8_L$ and $8_R$ is laterally slidably supported within the gear box 3, and the pinion 22 is meshed with a rack 24 formed on the steering rod 23.

The other ends of the inner cables 5i and 6i of the two Bowden wires 5 and 6 are wound around and fixed to an outer periphery of the follower pulley 20, and the other ends of the outer tubes 5o and 6o are fixed to the follower pulley housing 4. The structure of the follower pulley housing 4 and the structure of supporting of the Bowden wires 5 and 6 to the follower pulley housing 4 are substantially the same as the structure of the driving pulley housing 2, and hence, the description of these structures is omitted.

A motor 25 for a power-steering operation is accommodated in the motor accommodating chamber 18 in the gear box 3 and includes a stator 26 secured to an inner peripheral surface of the motor accommodating chamber 18, a motor output shaft 30 rotatably supported on the inner peripheral surface of the motor accommodating chamber 18 through three ball bearings 27, 28 and 29, and fitted over an outer periphery of the steering rod 23, and a rotor 31 secured to the motor output shaft 30 and opposed to the stator 26. A ball screw mechanism 32 is interposed between an inner peripheral surface of the motor output shaft 30 and an outer peripheral surface of the steering rod 23, so that a steerage assisting force for laterally reciprocating the steering rod 23 can be generated by driving the motor 25 to rotate the motor output shaft 30 in opposite directions.

The operation of the embodiment of the present invention having the above-described arrangement will be described below.

For example, when the steering wheel 1 is rotated leftwards to turn the vehicle leftwards, the rotary shaft 12 is rotated in a direction of an arrow A in FIG. 3 along with the driving pulley 13. As a result, the inner cable 6i of the Bowden wire 6 is pulled, and the inner cable 5i of the Bowden wire 5 is loosened. This causes the rotation of the driving pulley 13 to be transmitted. to the follower pulley 20 to rotate the rotary shaft 21, so that a steering torque is transmitted to the rack 24 through the pinion 22.

If the steering torque is detected by a detecting means (not shown), the detection value of the steering torque is subjected to a calculation along with another control signal in an electronic control unit, and the motor 25 for the power-steering operation is driven based on the result of the calculation. Then, the steering rod 23 is driven laterally by the motor 25 for the power-steering operation, thereby assisting the driver's manipulation of the steering wheel 1.

Since the steering wheel 1 and the gear box 3 are connected to each other by the Bowden wires 5 and 6 having a flexibility as described above, the steering wheel 1 can be disposed at any location with respect to the gear box 3, leading to an increased degree of freedom of the design. Thus, the gear box 3 can be commonly used in a right-hand steered vehicle and a left-hand steered vehicle, and the structures of a tilt mechanism and a telescopic mechanism for the steering wheel 1 can be simplified.

A conventional steering shaft connecting the steering wheel 1 and the gear box 3 is not used. Thus, the vibration of the gear box 3 and the vibration of an engine are not easily transmitted to the steering wheel 1, thereby providing an enhanced riding comfort, but also ensuring a sufficient space around driver's feet to provide an enhanced residence. Moreover, during a collision of the vehicle, the steering wheel 1 can be moved forwards of the vehicle body at a sufficient stroke. Thus, a large shock absorbing effect can be exhibited.

Now, the assembly of the driving pulley 13 to the driving pulley housing 2 is carried out in a procedure described below.

Before the driving pulley 13 is assembled to the driving pulley housing 2, the Bowden wires 5 and 6 are previously assembled to the driving pulley 13 by fixing each of tip ends of the inner cables 5i and 6i of the Bowden wires 5 and 6 to an end face of the driving pulley 13 and winding the inner cables 5i and 6i around pulley grooves of the pulley 13 in a plurality of turns. Then, the rotary shaft 12 is assembled to the driving pulley 13 and the driving pulley 13 is assembled to the first housing half 33 by fitting the tip end of the rotary shaft 12 to the ball bearings 37 mounted in the first housing half 33 in the driving pulley housing 2. In this case, the collars 38, 38 fitted over the Bowden wires 5 and 6 are previously fitted into the wire supporting grooves $33_2$, $33_2$ in the first housing half 33.

Subsequently, the division face 34, of the second housing half 34 is put into abutment against the division face $33_1$ of the first housing half 33 by inserting the rotary shaft 12 into the shaft bore $34_2$ in the second housing half 34 and then, the housing halves 33 and 34 are coupled to each other by four bolts 35. A wrench is brought into engagement with the hexagonal portion $39_3$ of each of the end pipes 39 to prevent turning. In this state, the hexagonal portion $38_3$ of the collar 38 is turned by another wrench. This causes the end pipe 39 to be pushed or pulled relative to the collar 38 by the meshing of the internal and external threaded portions $38_1$ and $39_2$. In this manner, the length of the outer tubes 5o and 6o relative to the inner cables 5i and 6i can be optimally adjusted.

As described above, the driving pulley housing 2 is divided into the first and second housing halves 33 and 34 and fixed so that the outer tubes 5o and 6o are sandwiched between the division faces 33₁ and 34₁ of the pulley housing halves 33 and 34. Therefore, in a state in which the Bowden wires 5 and 6 have been previously assembled, the driving pulley 13 can be assembled to the driving pulley housing 2, leading not only to a remarkably enhanced workability, but also to a necessary minimum length of the Bowden wires 5 and 6. When the second housing half 34 is coupled to the first housing half 33, the Bowden wires 5 and 6, which are difficult to be positioned because of their resilience, can be easily sandwiched between the housing halves 33 and 34 by fitting the collars 38, 38 into the wire supporting grooves 33₂, 33₂ in the first housing half 33 to temporarily fix them.

Although an embodiment of the present invention has been described in detail, it will be understood that the present invention is not limited to the above-described embodiment, and various modifications may be made without departing from the spirit and scope of the invention defined in claims.

For example, the present invention is applied to both of the driving pulley housing 2 and the follower pulley housing 4 in the embodiment. But, the present invention may also be applied to only one of the driving pulley housing 2 and the follower pulley housing 4.

The driving pulley 13 and the follower pulley 20 are employed as the wire driving means and the wire follower means in the above embodiment. But in place of the pulleys 13 and 20, arms may be employed which are secured at their central portion to the rotary shafts 12 and 21 and connected at their opposite ends to the inner cables 5i and 6i of the Bowden wires 5 and 6.

As discussed above, according to claim 1 of the present invention, at least one of the wire driving means accommodating housing and the wire follower means accommodating housing is divided into a first housing half and a second housing half detachably coupled to the first housing half, and is supported so that the wires are sandwiched between division faces of the housing halves. Therefore, the assembling can be completed only by accommodating the assembly of the wires connected at their ends to the wire driving means and/or the wire follower means into the housing. As a result, the end of the wire need not be manually drawn into the housing in the assembling, and even if the length of the wire is of a necessary minimum value, the assembling can be achieved.

What is claimed is:

1. A cable-type steering device, comprising:

a wire driving means connected to and rotated by a steering wheel, said wire driving means being housed in a wire driving means accommodating housing;

a wire follower means rotatable connected to a gear box for steering vehicle wheels, said wire follower means being housed in a wire follower means accommodating housing; and wires connected at opposite ends to said wire driving means and said wire follower means, respectively, to transfer a steering torque provided through the steering wheel to the gear box through said wires, one of the opposite end of said wires having an end pipe, the end pipe having means for regulating rotation of the end pipe, wherein at least one of said wire driving means accommodating housing and said wire follower means accommodating housing is divided into a first housing half and a second housing half detachably coupled to said first housing half, said first and second housing halves respectively having a pair of wire supporting portions, said wire supporting portions having recessed portions which cooperatively define a bore when the wire supporting portions are mated with each other, and said wires are sandwiched and supported between division faces of said housing halves, wherein a cylindrical collar is received rotatably without axial movement in said bore, said cylindrical collar having rotation drive means, and wherein axial position adjusting means is provided between said collar and said end pipe, and when said rotation drive means is operated, said collar is rotated within said bore and the axial position of said end pipe is adjusted relative to said collar through the operation of said axial position adjusting means.

2. A cable-type steering device as recited in claim 1, wherein said axial position adjusting means comprises an external threaded portion formed on an outer periphery of said end pipe and an internal threaded portion formed on an inner periphery of a bore formed in said collar, said external and internal threaded portions being threadedly engaged with each other.

3. A cable-type steering device, comprising:

wires having first end pipes on first ends of said wires, the first end pipes having means for regulating rotation of the first end pipes;

a wire driving device connected to and rotated by a steering wheel;

a wire driving housing accommodating said wire driving device and having first and second housing halves;

a first collar having a bore extending therethrough sandwiched rotatable between said housing halves and anchored to be axially non-movable; and axial position adjusting means, provided between one of said first end pipes and said first collar, for adjusting an axial position of said end pipe relative to said collar through rotation of said collar.

4. A cable-type steering device as recited in claim 3, wherein said wires have second end pipes on second ends of said wires; and further comprising:

a wire follower device rotatably connected to a gear box; and a wire follower housing accommodating said wire follower device and having first and second housing halves between which a second collar to be engaged with said second end pipe is sandwiched rotatably and anchored to be axially non-movable.

5. A cable-type steering device as recited in claim 3, wherein said axial position adjusting means comprises an external threaded portion formed on an outer periphery of said first end pipe and an internal threaded portion formed on an inner periphery of said in said first collar, said external and internal threaded portions being threadedly engaged with each other.

6. A cable-type steering device, comprising:

a driving pulley connected to and rotated by a steering wheel;

a driving pulley housing having a circular portion accommodating said driving pulley and a pair of wire support portions extending in a tangential direction of said driving pulley, said driving pulley housing being divided into first and second halves;

a pair of wires, each wire having an end pipe; and a first collar sandwiched rotatably between said first and second halves of said driving pulley housing, respectively in said pair of wire support portions, said first collar having a flange portion anchoring said first collar against axial movement in an annular groove of each of said pair of wire support portions, axial position adjusting means, provided between said end pipe and said first collar for adjusting an axial position of said end pipe relative to said wire support portions through rotation of said first collar.

7. A cable-type steering device as recited in claim 6, further comprising:

a follower pulley rotatable connected to a gear box;

a follower pulley housing having a circular portion accommodating said follower pulley and a pair of wire support portions extending in a tangential direction of said follower pulley, said follower pulley housing being divided into first and second halves; and a second collar on an opposite end of each of said wires sandwiched rotatable between said first and second halves of said follower pulley housing, respectively in said pair of wire support portions, said second collar having a flange portion anchoring said second collar against axial movement in an annular groove of each of said pair of wire support portions of said follower pulley housing.

8. A cable-type steering device as recited in claim 6, wherein said axial position adjusting means comprises an external threaded portion formed on an outer periphery of said end pipe and an internal threaded portion formed on an inner periphery of a bore formed in said first collar, said external and internal threaded portions being threadedly engage with each other.

9. A cable-type steering device, comprising:

a driving pulley connected to and rotated by a steering wheel, said driving pulley being housed in a driving pulley housing;

a follower pulley rotatable connected to a gear box, said follower pulley being housed in a follower pulley housing; and a pair of wires, each wire being connected at opposite ends to said driving pulley and said follower pulley, respectively, to transfer a steering torque provided through the steering wheel to the gear box through said wires, wherein at least one of said driving pulley housing and said follower pulley housing has a circular portion accommodating either said driving pulley or said follower pulley and a pair of wire support portions extending in a tangential direction of said circular portion, said at least one of said driving pulley housing and said follower pulley housing being divided into first and second halves; and wherein each of said pair of wires has an end pipe which is engaged with a collar sandwiched rotatable between said first and second halves of said at least one of said driving pulley housing and said follower pulley housing, respectively in said pair of wire support portions, said collar having a flange portion anchoring said collar against axial movement in an annular groove of each of said pair of wire support portions and said end pipe being positioned axially adjustable with respect to said collar.

* * * * *